United States Patent [19]

Mattila

[11] Patent Number: 5,529,316
[45] Date of Patent: Jun. 25, 1996

[54] ADJUSTABLE TIE ROD ASSEMBLY

[75] Inventor: Brian A. Mattila, Saginaw, Mich.

[73] Assignee: American Axle & Manufacturing, Inc., Saginaw, Mich.

[21] Appl. No.: 391,408

[22] Filed: Feb. 16, 1995

[51] Int. Cl.$^6$ .................................................. B62D 7/16
[52] U.S. Cl. ............................................................ 280/95.1
[58] Field of Search ............................................. 280/95.1

[56] References Cited

U.S. PATENT DOCUMENTS 5,157,987  10/1992  Satoh et al. ............................ 280/95.1

*Primary Examiner*—Kenneth R. Rice
*Attorney, Agent, or Firm*—Reising, Ethington, Barnard & Perry

[57] ABSTRACT

An automotive vehicle has a parallelogram type steering linkage that includes two adjustable tie rod assemblies. Each adjustable tie rod assembly comprises a tie rod and a right angled ball joint at each end of the tie rod for connecting the tie rod assembly in the steering linkage system. The tie rod has a threaded end that is screwed into an internally threaded portion of the housing of the ball joint at the outboard end of the tie rod. The threaded end of the tie rod carries a jam nut that is tightened against the housing to maintain the depth of the threaded end of the tie rod in the internally threaded portion of the housing. The inboard end of the tie rod has a cylindrical head. The cylindrical head is rotatably fit and axially captured in a cylindrical bore of the housing of the ball joint at the inboard end of the tie rod. The tie rod has a median section of hexagonal shape for rotating the tie rod. The length of the tie rod assembly can be adjusted while it is connected in the steering linkage system to adjust wheel toe because the tie rod can be rotated with respect to the ball joints when the jam nut is loosened. The adjustable tie rod assembly uses low friction, lash free ball joints and can be automatically adjusted by machine easily because it has a single jam nut.

15 Claims, 2 Drawing Sheets

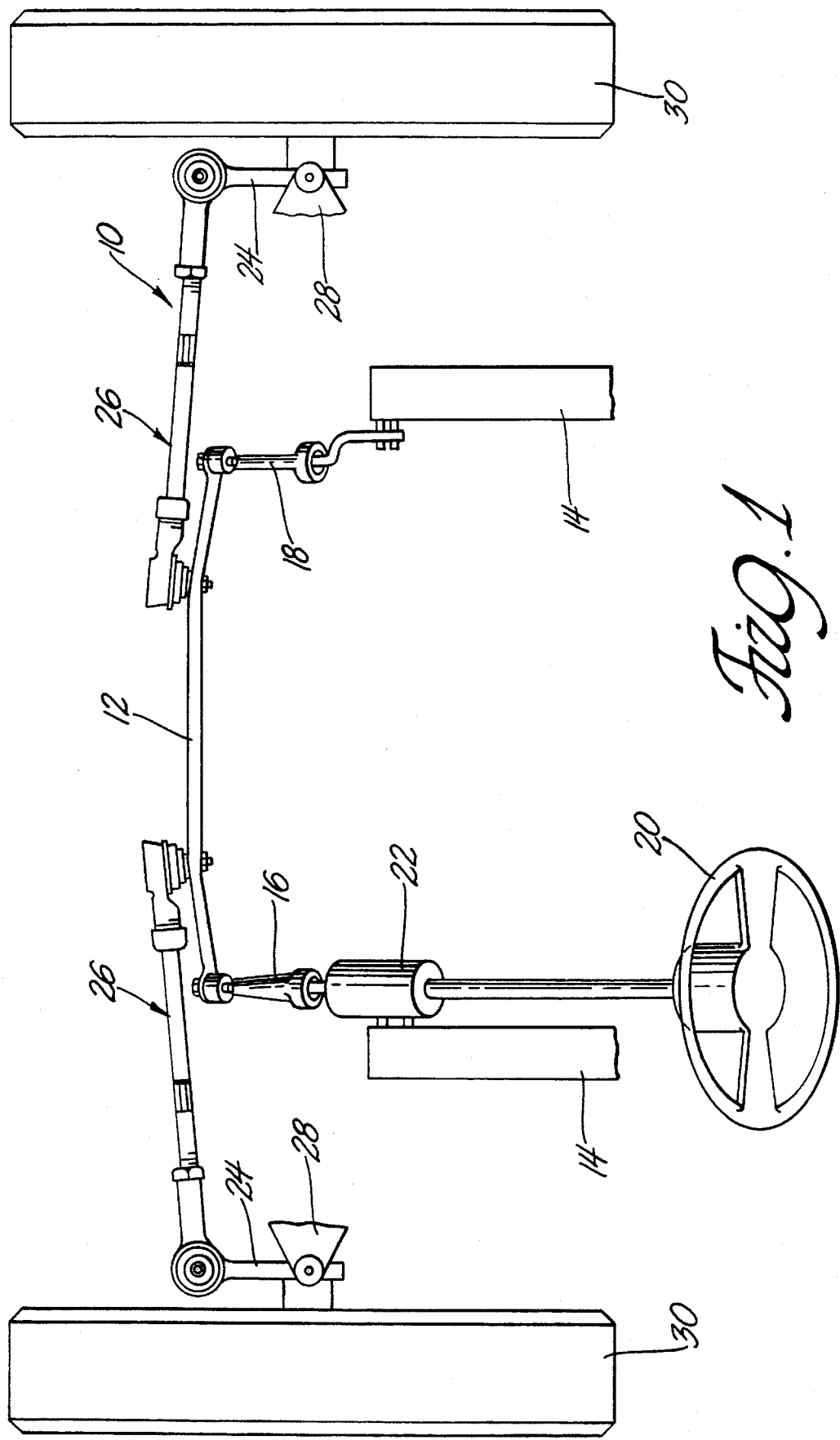

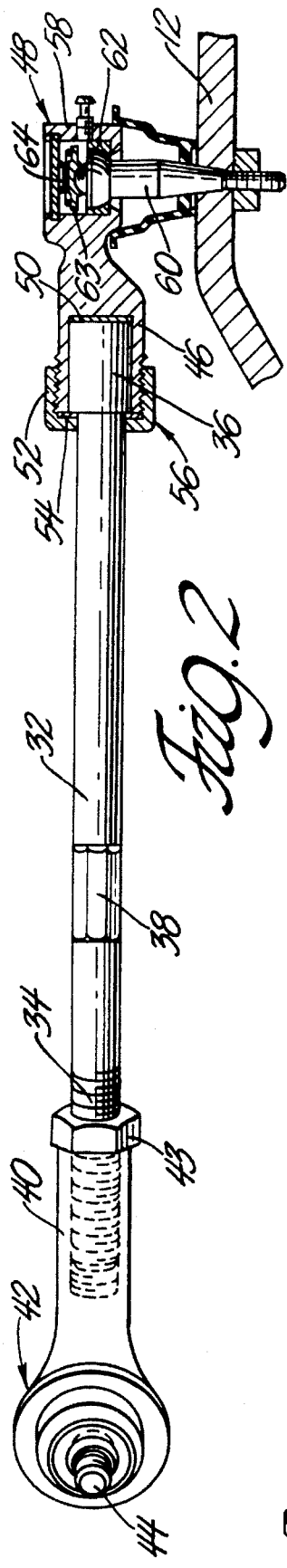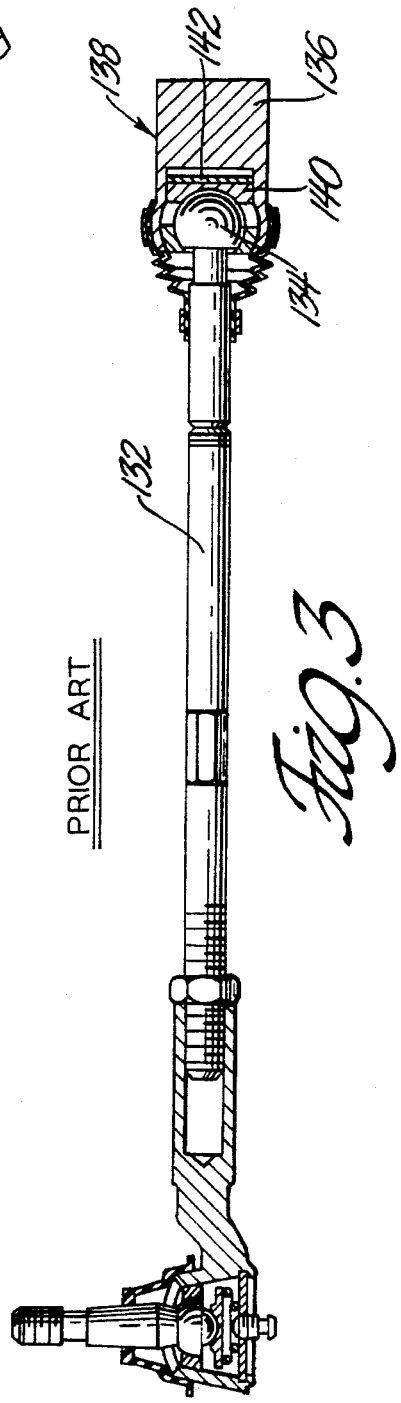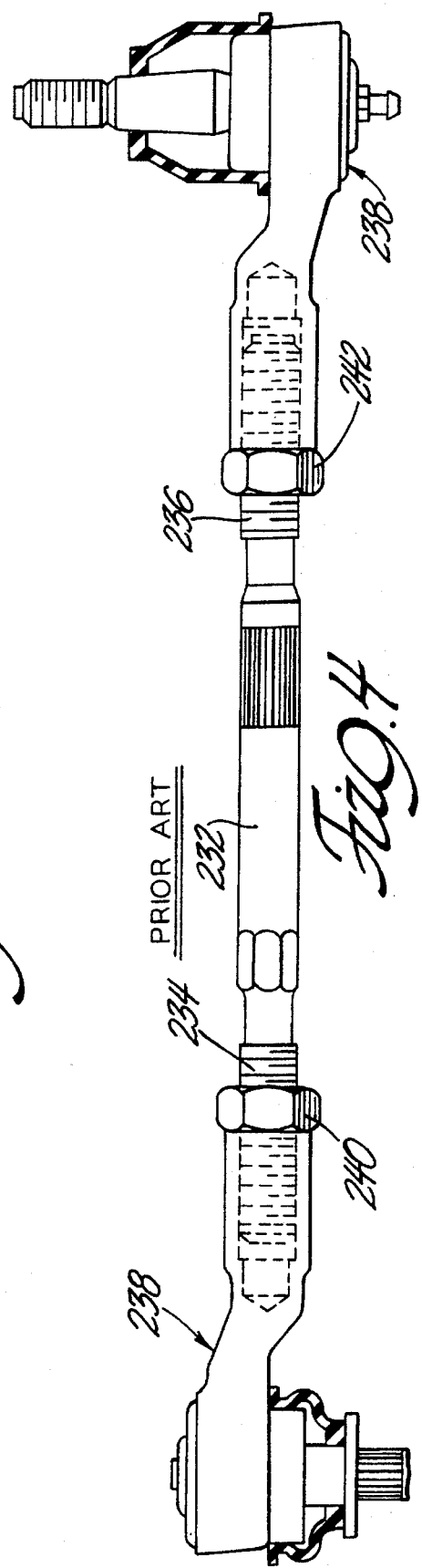

ADJUSTABLE TIE ROD ASSEMBLY

BACKGROUND OF THE INVENTION

This invention relates generally to a tie rod assembly and more particularly to an adjustable tie rod assembly for a steering linkage system including types having several ball joints such as those generally known as a parallelogram steering linkage system.

A parallelogram steering linkage system comprises a relay rod that is connected to the frame or chassis of an automobile by two pivoting members, such as a pitman arm and an idler, in a parallelogram arrangement so that the relay rod savings back and forth laterally in response to steering inputs from the steering wheel of the automobile via a steering gear. The pivoting members are connected to the relay rod by ball joints. The opposite end portions of the relay rod are each connected to a steering knuckle by a tie rod assembly. The tie rod assemblies are connected to the relay rod by ball joints. The steering knuckles turn the front wheels of the automobile to steer the automobile in response to movements of the relay rod and the tie rods that connect the relay rod to the steering knuckles. The steering knuckles are connected to suspension members by ball joints. Some parallelogram steering linkage systems also include a drag link for moving the relay rod. These systems and other systems having several ball joints are sensitive to ball joint friction.

Wheel toe is the angular position of the front wheel with respect to a vertical longitudinal plane of the vehicle at zero steering input. Ideally the wheel toe is zero so that the vehicle tracks in a straight line when the steering input is zero. The wheel toe for each front wheel is adjusted by adjusting the length of the associated tie rod assembly.

One known type of adjustable tie rod assembly has low friction ball joints at each end and a dual jam nut arrangement for adjustment. This dual jam nut arrangement which is shown in FIG. 4 of the patent drawing, comprises a tie rod that has oppositely threaded ends. Each threaded end is screwed into an internally threaded portion of a ball joint housing. The tie rod also carries a jam nut at each end that is tightened against the adjacent housing to maintain the depth of the threaded end in the housing. The length of the tie rod assembly is adjusted while connected in the steering linkage system by loosening the two jam nuts and turning the tie rod with respect to the two ball joint housings at the respective ends of the tie rod. The two jam nuts are then tightened down after the adjustment is made to maintain the adjustment.

A disadvantage of the dual jam nut type adjustable tie rod assembly is that two jam nuts must be loosened and then retightened to adjust the length of the assembly. Moreover the two jam nuts must be turned in opposite directions for loosening and then turned in opposite directions for retightening. This characteristic makes manual adjustment tedious, time consuming and complicated. Furthermore a machine for automatically adjusting the dual jam nut type adjustable tie rod assembly is not available.

Another known type of adjustable tie rod assembly has a high friction, in-line ball joint at one end and a single jam nut arrangement for adjustment. This adjustable tie rod assembly, shown in FIG. 3 of the patent drawings is used in connection with rack and opinion steering systems that can tolerate high friction ball joints. This rack and pinion type adjustable tie rod assembly comprises a tie rod that has a concentric ball at one end and external threads at the opposite end. The concentric ball is pivotally mounted in an axially oriented housing of the steering rack to form a high friction in-line ball joint at one end of the tie rod. The threaded end of the tie rod is screwed into an internally threaded portion of the housing of an angled ball joint at the opposite end of the tie rod. The tie rod also carries a single jam nut that is tightened against the housing of the angled ball joint to maintain the depth of the threaded end in the housing. The length of the tie rod assembly is adjusted while connected in the rack and pinion steering system by loosening the single jam nut and turning the tie rod with respect to the two ball joint housings at opposite ends of the tie rod. The jam nuts is then tightened down after the adjustment is made.

The single jam nut arrangement simplifies manual adjustment in comparison to the dual jam nut arrangement. Machines are also available for automatically adjusting the single jam nut type adjustable tie rod assembly. However, the rack and pinion type adjustable tie rod assembly has several disadvantages. One disadvantage is that the in-line ball joint formed by the concentric ball of the tie rod is heavily preloaded to resist steering forces transmitted to the tie rod and to eliminate lash in the steering linkage system. This results in high friction in the in-line ball joint and increased steering effort. Another disadvantage is that as a practical matter, the ball end of tie rod must be connected to the end of the adjoining link which limits the application of this type adjustable tie rod assembly. Because of these disadvantages the concentric ball, single jam nut design is not feasible for all types of steering linkage systems. For instance the design is not feasible for use in parallelogram steering linkage systems which do not tolerate high friction ball joints very well. The design is also not feasible for use in steering linkage systems where the tie rod is connected to the relay rod at an inboard position, such as in the case of parallelogram steering linkage systems that are commonly used in light trucks.

SUMMARY OF THE INVENTION

The object of this invention is to provide an adjustable tie rod assembly that has a single jam nut to facilitate adjustment and low friction, lash free ball joints at each end to accommodate a wider range of steering linkage applications.

A feature of the invention is that the adjustable tie rod assembly includes a separate spin joint so that a low friction, lash free ball joint can be used at each end.

Another feature of the invention is that the adjustable tie rod assembly includes a separate spin joint at one end so that an angled, low friction ball joint can be used at that end.

Another feature of the invention is that the adjustable tie rod assembly can be attached by angled, low friction ball joints at each end so that the adjustable tie rod assembly is well suited for use in a parallelogram steering linkage system.

Yet another feature of the invention is that the adjustable tie rod assembly can be attached to existing relay rods of parallelogram steering linkage systems without modification to the relay rods.

Still yet another feature of the invention is that the adjustable tie rod assembly can be attached to a relay rod or other steering system link at an inboard position easily.

Still yet another feature of the invention is that the adjustable tie rod assembly has a single jam nut at one end and a separate spin joint at the other end to facilitate adjustment and low friction ball joints at each end to accommodate a wide variety of steering linkage systems.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is a partial schematic plan view of an automotive vehicle having a parallelogram steering linkage system equipped with an adjustable tie rod assembly in accordance with the invention;

FIG. 2 is a partially sectioned view of the adjustable tie rod assembly that is shown in FIG. 1;

FIG. 3 is a partially sectioned front view of a prior art adjustable tie rod assembly; and FIG. 4 is a partially sectioned front view of another prior art adjustable tie rod assembly.

DESCRIPTION OF THE INVENTION

Referring now to the drawing, FIG. 1 is a partial schematic plan view of the front end of an automotive vehicle having a parallelogram steering linkage system indicated generally at 10. The steering linkage system 10 generally comprises a relay rod 12 that is connected to the frame or chassis 14 of the automotive vehicle by two pivoting members, such as a pitman arm 16 and an idler arm 18. The relay rod 12, chassis 14, pitman arm 16 and idler 18 form a parallelogram so that the relay rod 12 moves laterally in response to steering inputs from steering wheel 20 which operates steering gear 22 to rotate the pitman arm 16. The pitman arm 16 and the idler arm 18 are connected to the opposite ends of the relay rod 12 by ball joints and the idler arm 18 is connected to the chassis 14 by another ball joint. The idler arm 18 is connected to a rotatable output of the steering gear 22 which is mounted on the chassis 14.

The opposite end portions of the relay rod 12 are also each connected to a steering knuckle 24 by an adjustable tie rod assembly 26 of the invention. The steering knuckles 24 are typically pivotally mounted by ball joints to upper and lower control arms 28 or other moveable members of a suspension system that is attached to the chassis 14 so that the front wheels 30 can move up and down as well as turn to steer the automotive vehicle.

The front wheels 30 are turned in response to lateral movements of the relay rod 12 via the adjustable tie rod assemblies 26 of the invention that connect the opposite end portions of the relay rod 12 to the respective steering knuckles 24. Each tie rod assembly 26 is connected to the relay rod 12 and one of the steering knuckles 24 by a low friction, lash free ball joint as explained below.

Wheel toe is the angular position of the front wheel 30 with respect to a vertical longitudinal plane of the automotive vehicle at zero steering input. Ideally the wheel toe is zero so that the automotive vehicle tracks in a straight line when the steering input is zero. The wheel toe for each front wheel 30 is adjusted by adjusting the length of the associated adjustable tie rod assembly 26 while the tie rod assembly in connected in the steering linkage system.

Referring now to FIG. 2, the adjustable tie rod assembly 26 comprises a tie rod 32 having a ball joint at each end for connecting the tie rod assembly 26 in the steering linkage system 10. The tie rod 32 has an external thread 34 at one end, a cylindrical head 36 at the opposite end, and an intermediate portion 38 of hexagonal shape (or some other shape to facilitate turning the tie rod 32). The threaded end is screwed into an internally threaded sleeve portion 40 of a housing of a ball joint 42. The threaded end of the tie rod 32 also has a jam nut 43 that is tightened against the sleeve portion 40 of the housing to prevent rotation of the tie rod 32 and maintain the depth of the threaded end of the tie rod 32 in the internally threaded sleeve portion 40 of the housing of the ball joint 42. The ball joint 42 is an angled ball joint that has low friction, lash free characteristics as explained below. It has a ball stud 44 that is at an angle to the coincidental axes of the sleeve portion 40 and the tie rod 32. The internal parts are identical to those of the angled ball joint at the opposite end of the tie rod 32 that are described below. The ball stud 44 is bolted to a steering arm of the steering knuckle 24 in a conventional manner.

The cylindrical head 36 of the tie rod 32 is rotatably fit and axially captured in a blind ended cylindrical bore in a sleeve portion 46 of a housing of an angled ball joint 48 at the opposite end of the tie rod 32. The end of the cylindrical head 36 and the blind end of the cylindrical bore are preferably flat and a plain thrust bearing 50 is preferably disposed between the flat end of the cylindrical head 36 and the flat blind end of the cylindrical bore to reduce friction when the head 36 is turned in the bore. The cylindrical head 36 is captured in the bore by an annular screw cap 52 that has an annular flange that extends radially inwardly of the annular shoulder at the inboard end of the cylindrical head. The annular flange and the annular shoulder are also preferably flat and a thrust washer 54 is preferably disposed between the annular flange and the annular shoulder. The plain thrust bearing 50 and thrust washer 54 are preferably a composite comprising a Teflon impregnated bronze layer on a steel backing.

The cylindrical head 36, sleeve portion 46, screw cap 52 and optional but preferred thrust bearing 50 and thrust washer 54 provide a separate spin joint 56 that allows the tie rod 32 to rotate relative to the housing of the ball joint 48. The spin joint 56 accommodates adjustment totally independent of the operation of the ball joint 48. Consequently an angled ball joint 48 that has low friction, lash free characteristics can be used at this end of the tie rod assembly 26. Moreover, the torque characteristics of the spin joint 56 can be adjusted by turning the screw cap 52. I have found that the screw cap 52 can be torqued down from about 10 to 50 newton-meters and that the torque required to spin the tie rod 32 ranges only from about 2 to about 10 newton-meters when the preferred thrust bearing 50 and thrust washer 54 described above are used. Consequently the tie rod assembly 26 can be adjusted easily.

The angled ball joint is a low friction, lash free ball joint of conventional construction. It comprises an annular connector portion 58 of the housing for the slip joint 56 that has an axis that is perpendicular to the coincidental axes of the tie rod 32 and sleeve portion 46 of the housing. A ball stud 60 that is bolted to the relay 12 in a conventional manner has a lower ball part that is seated against a spherical bearing seat 62 that is nested in the annular connector portion 58. The ball stud 60 has an upper ball part that is seated in a ball cap 63 that is disposed in the annular connector portion 58. The ball cap 63 is biased against the upper ball part by a coil spring 64. This preloads the ball joint 48 and takes up any lash in the ball joint 48. However, coil spring 64 does not have to resist steering forces to any great extent because steering loads are primarily resisted by the annular connector portion 58 via the spherical bearing seat 62. Consequently the preload of the coil spring 64 is light and the adjustable tie rod assembly 26 of the invention has low friction, lash free ball joints 42 and 48. Moreover the perpendicular orientation of the ball stud 60 facilitates an inboard connection to adjoining steering links as shown in FIG. 1 where the two adjustable tie rod assemblies 26 are connected to inboard end portions of the relay rod 12.

Neither of these advantages are possible with the rack and pinion type adjustable tie rod assembly of the prior art that is discussed above and shown in FIG. 3. In this single jam nut prior art design the tie rod 132 has a concentric ball 134 at one end that is pivotally mounted in an axially oriented housing 136 of the steering rack to form an in-line ball joint 138. Because of this axial orientation, the steering forces are transmitted to the ball cap 140. Consequently, the ball cap 140 is spring loaded against the integral ball by a Belleville washer 142 or other high load type spring because the ball cap 140 must counteract the steering forces in addition to taking up any lash in the ball joint 138. Consequently the ball joint 138 has a high preload which results in a high friction ball joint. As indicated earlier, a high friction ball joint is not desirable in a parallelogram steering linkage system or any other steering linkage system that is characterized by a large number of ball joints.

The adjustable tie rod assembly 26 of the invention with its angled low friction lash free ball joints is also adjusted easily either manually or by machine since only one jam nut needs to be loosened and then retightened to rotate the tie rod 32 with respect to the angled ball joints 42 and 48 by means of the intermediate portion 38 to change the length of the tie rod assembly 26.

This adjustability advantage is not possible with the dual jam nut design of the prior art that is discussed above and that is illustrated in FIG. 4. This dual jam nut arrangement comprises a tie rod 232 that has oppositely threaded ends 234 and 236. Each threaded end is screwed into an internally threaded portion of the housing of a conventional low friction, zero lash angled ball joint 238. However the tie rod 232 also carries dual jam nuts 240 and 242 that are tightened against the respective adjacent ball joint housings to maintain the adjusted depth of the threaded ends 234 and 236 in their associated housing portions. Consequently adjusting the length of this prior art tie rod assembly while connected in the steering linkage system requires loosening the two jam nuts 240 and 242 by turning them in opposite directions and then retightening the two jam nuts 240 and 242 by turning them in the opposite direction. As indicated earlier this characteristic makes manual adjustment complicated, tedious and time consuming. Furthermore automatic adjustment of the dual jam nut arrangement by machine is not available at this time.

While the invention has been discussed in connection with a particular steering linkage system, the adjustable tie rod assembly of the invention can be used in any steering linkage system including other parallelogram types such as those having outboard tie rod connections or drag links to operate the relay rod.

Moreover while the right angled ball joint 48 that has been described is preferred for maximum benefit friction can be reduced with an annular connector portion 58 and/or ball joint 48 at any practical angle.

Furthermore, even though the arrangement of the ball joint 48 is preferred, the ball joint can be reversed for some applications. That is, the stud end of the ball stud 60 can be connected to the annular connector portion 58 and the ball end connected to the relay rod 12.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An adjustable tie rod assembly comprising;
   a tie rod having a connector at each end for connecting the tie rod assembly in a steering linkage system of an automotive vehicle,
   the tie rod having a threaded portion at one end and a cylindrical portion at the other end,
   the threaded portion of the tie rod being screwed to a threaded portion of the connector at the one end of the tie rod,
   one of the threaded portions having a jam nut that is tightened against the other threaded portion to maintain the relative position of the threaded portions with respect to each other,
   the cylindrical portion of the tie rod being rotatably fit on and axially captured with respect to a cylindrical portion of the connector at the opposite end of the tie rod, whereby the length of the tie rod assembly can be adjusted while it is connected in a steering linkage system by rotating the tie rod with respect to the connectors at each end simultaneously when the jam nut is loosened, and
   the connector at the opposite end of the tie rod having an annular connector portion that has an axis at an angle with respect to the axis of the tie rod or the axis of the cylindrical portion of the connector.

2. The adjustable tie rod assembly as defined in claim 1 wherein the annular connector portion is a housing for a ball joint.

3. The adjustable tie rod assembly as defined in claim 1 wherein the annular connector portion is at a right angle.

4. The adjustable tie rod assembly as defined in claim 1 wherein the annular connector portion is at a right angle and provides a housing for a low friction; lash free ball joint.

5. The adjustable tie rod assembly as defined in claim 1 wherein the tie rod rotates with respect to the said connector at the opposite end of the tie rod independently of the annular connector portion.

6. The adjustable tie rod assembly as defined in claim 1 wherein one of the cylindrical portions has a screw cap to adjust the torque requirements for rotating the tie rod with respect to the said connector at the opposite end of the tie rod.

7. An adjustable tie rod assembly for a steering linkage system having a relay rod that swings back and forth laterally comprising;
   a tie rod having a ball joint at each end for connecting the adjustable tie rod assembly in the steering linkage system of an automotive vehicle,
   the tie rod having a threaded end and a cylindrical head at the other end,
   the threaded end being screwed into an internally threaded portion of the ball joint at one end of the tie rod,
   the threaded end of the tie rod having a jam nut that is tightened against the ball joint to maintain the depth of the threaded end of the tie rod in the internally threaded portion of the ball joint, the cylindrical head of the tie rod being rotatably fit and axially captured in a cylindrical bore of the ball joint at the opposite end of the tie rod, and the tie rod having an intermediate portion for rotating the tie rod with respect to the ball joints at each end whereby the length of the tie rod assembly can be adjusted while it is connected in the steering linkage system by rotating the tie rod with respect to the ball joints at each end when the jam nut is loosened.

8. The adjustable tie rod assembly as defined in claim 7 wherein the ball joint at the opposite end of the tie rod is angled to reduce friction.

9. The adjustable tie rod assembly as defined in claim 7 wherein the ball joint at the opposite end of the tie rod is a right angled ball joint.

10. The adjustable tie rod assembly as defined in claim 7 wherein the tie rod rotates with respect to the ball joint at the opposite end of the tie rod independently of the operation of the ball joint.

11. The adjustable tie rod assembly as defined in claim 7 wherein the ball joint at the opposite end of the tie rod has a screw cap to adjust the torque requirements for rotating the tie rod with respect to the said ball joint at the opposite end of the tie rod.

12. In a steering linkage system of an automotive vehicle having a relay rod that swings back and forth laterally in response to steering inputs and an adjustable tie rod assembly including a tie rod having a ball joint at each end for connecting the tie rod assembly to the relay rod and another member of the steering linkage system, the tie rod having a threaded end that is screwed into an internally threaded portion of one of the ball joints, the threaded end of the tie rod having a jam nut that is tightened against the ball joint to maintain the depth of the threaded end of the tie rod in the internally threaded portion of the ball joint, the combination comprising:

the tie rod having a cylindrical head at an opposite end, and the ball joint at the opposite end of the tie rod having a cylindrical bore, the cylindrical head of the tie rod being rotatably fit and axially captured in the cylindrical bore of the ball joint at the opposite end of the tie rod, to provide a spin joint that operates independently of the ball joint at the opposite end of the tie rod whereby the length of the tie rod assembly can be adjusted while it is connected in the steering linkage system by rotating the tie rod with respect to the ball joints at each end when the jam nut is loosened.

13. The adjustable tie rod assembly as defined in claim 12 wherein the ball joint at the opposite end of the tie rod is angled to reduce friction.

14. The adjustable tie rod assembly as defined in claim 12 wherein the ball joint at the opposite end of the tie rod is a right angled joint to reduce friction.

15. The adjustable tie rod assembly as defined in claim 12 wherein the ball joint at the one of the cylindrical opposite end of the tie rod has a screw cap to adjust the torque requirements for rotating the tie rod with respect to the ball joint at the tie rod.

* * * * *